G. W. ROWELL.
COUPLING.

No. 170,019. Patented Nov. 16, 1875.

WITNESSES
Robert Everett
Walter C. Masi

INVENTOR
Geo. W. Rowell
Chipman and Hosmer & Co
ATTORNEYS

UNITED STATES PATENT OFFICE.

GEORGE W. ROWELL, OF MOUNT UPTON, NEW YORK.

IMPROVEMENT IN COUPLINGS.

Specification forming part of Letters Patent No. 170,019, dated November 16, 1875; application filed July 24, 1875.

*To all whom it may concern:*

Be it known that I, GEORGE W. ROWELL, of Mount Upton, in the county of Chenango and State of New York, have invented a new and valuable Improvement in Couplings; and I do hereby declare that the following is a full, clear, and exact description of the construction and operation of the same, reference being had to the annexed drawings, making a part of this specification, and to the letters and figures of reference marked thereon.

Figure 1:
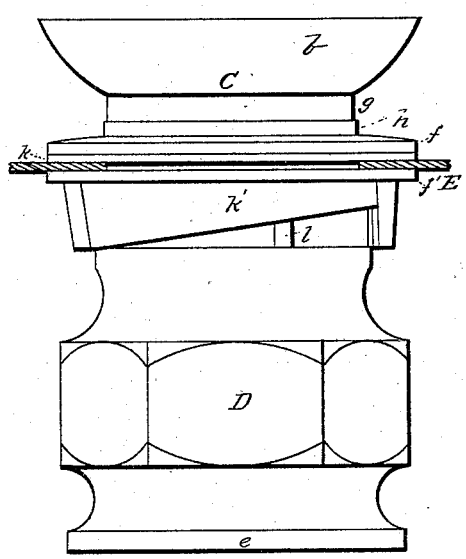
Figure 2:
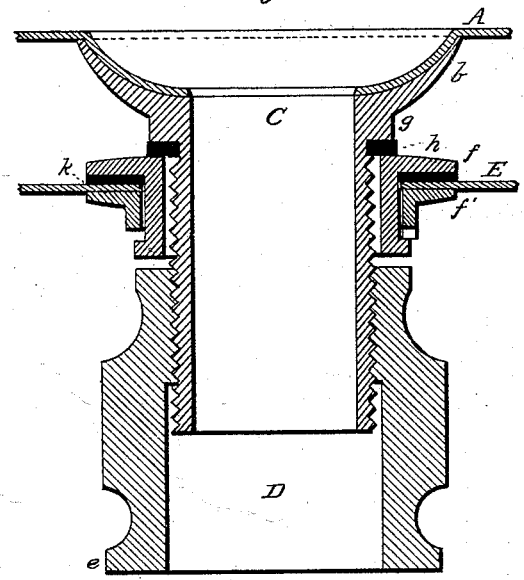
Figure 3:
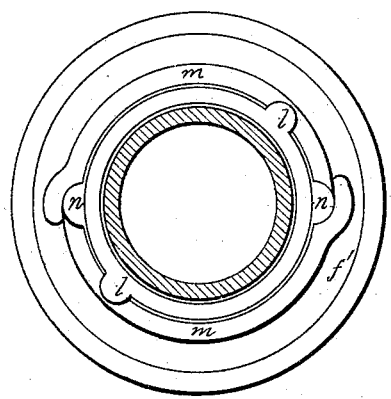
Figure 4:
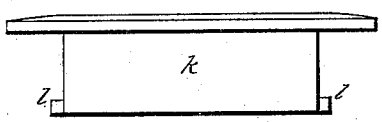
Figure 5:
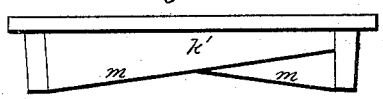

Figure 1 of the drawings is a representation of an outside view of my coupling. Fig. 2 is a vertical central sectional view of the same, and Fig. 3 is a horizontal sectional view thereof. Fig. 4 is a detail view.

This invention has relation to coupling or discharging spouts for milk-pans; and it consists in the construction and novel arrangement of the threaded and flanged tube, the flanged nut engaging therewith, and the coupling-rings for securing these parts to the water-vat, as hereinafter fully shown and described.

In the accompanying drawings, the letter A designates a portion of the bottom of a milk-pan, to which the concave flange $b$ of the threaded milk-tube C is connected. This tube is designed to be made of brass, and to engage with an iron nut, D, which is provided with a ledge or flange, $e$, at its lower end for the attachment of a draw-off or waste pipe. This combination of brass and iron will decrease the rusting tendency. A shoulder, $g$, is formed upon the external wall of the tube C, and provided with a packing-ring, $h$, of rubber or other suitable material, against which the upper coupling-ring $k$ bears. Thus a water-tight joint is formed at the entrance to the screw-thread. The upper coupling-ring $k$ consists of a cylindrical body, which fits within the body of the lower coupling-ring $k'$, and a flange, $f$, which extends outward from its upper edge. At its lower edge are provided the bearing-lugs $l$. The lower coupling-ring has a flange, $f'$, between which and the flange $f$ of the upper ring is received the margin of the aperture in the vat E, a suitable packing-ring being interposed under the upper flange to secure a tight joint when said flange is not soldered to the vat. The lower edge of the ring $k'$ is provided with inclines or cams $m$, which engage with the lugs $l$ of the ring $k$ when either ring is turned, and bring the flanges toward each other upon the iron of the vat and the interposed packing. Grooves $n$ are made in the inner wall of the exterior ring $k'$ for the passage of the lugs $l$ of the inner ring when the latter is slipped within the former. When the parts are in place, as described, the nut D is screwed up firmly on the tube C, securing all the parts rigidly together.

What I claim as new, and desire to secure by Letters Patent, is—

The combination of the flanged and threaded tube C, the nut D, and the coupling-rings $k$ $k'$, having the flanges $f f'$, the engagement-lugs $l$, and the cams $m$, substantially as specified.

In testimony that I claim the above I have hereunto subscribed my name in the presence of two witnesses.

GEORGE W. ROWELL.

Witnesses:
JACOB STOWELL,
PERRY ROOD.